April 15, 1958 J. S. WOODWARD 2,830,437
TEMPERATURE INDICATING AND RESPONSIVE CONTROL
APPARATUS HAVING THERMAL LAG COMPENSATION
Original Filed Oct. 1, 1947
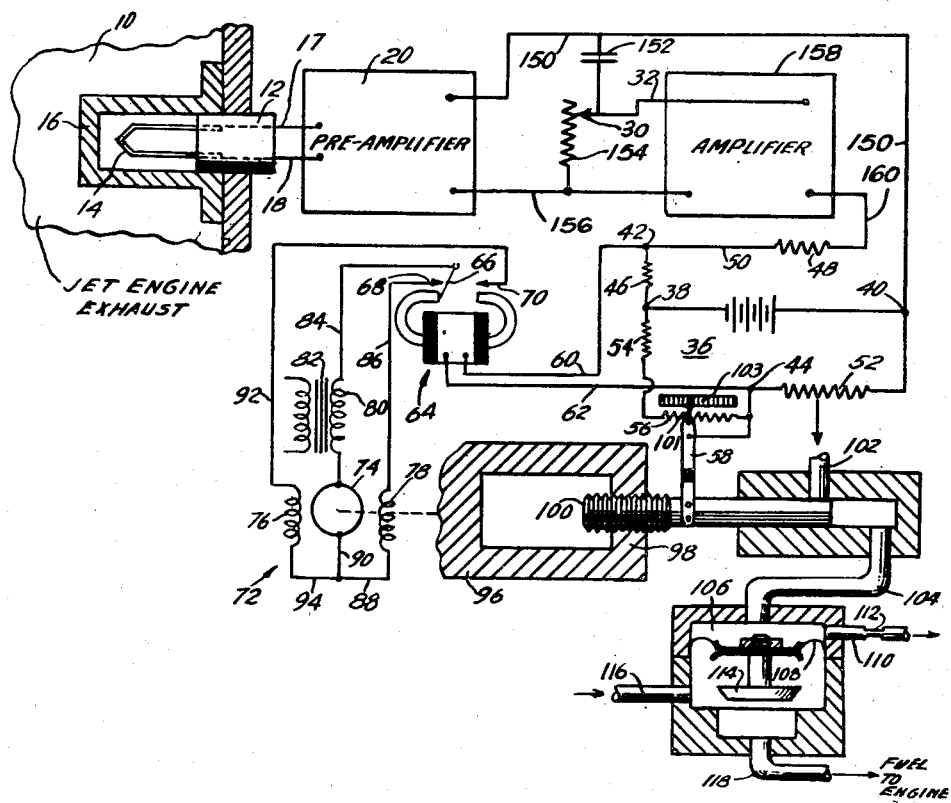
INVENTOR
J. S. WOODWARD
BY
ATTORNEY

United States Patent Office

2,830,437
Patented Apr. 15, 1958

2,830,437

TEMPERATURE INDICATING AND RESPONSIVE CONTROL APPARATUS HAVING THERMAL LAG COMPENSATION

James S. Woodward, West Hartford, Conn., assignor, by mesne assignments, to Pratt & Whitney Company, Incorporated, West Hartford, Conn., a corporation of Delaware Original application October 1, 1947, Serial No. 777,321, now Patent No. 2,690,647, dated October 5, 1954. Divided and this application July 23, 1954, Serial No. 445,311

9 Claims. (Cl. 60—39.28)

The present invention is related to temperature responsive indicating or control apparatus, and especially to such apparatus as is concerned with the measurement of very high and rapidly fluctuating temperatures; and this application is a division of my parent application, Serial No. 777,321, filed October 1, 1947, and now Patent No. 2,690,647.

In the measurement of very high temperatures, it is customary to use a thermocouple, which produces an electrical voltage proportional to the temperature to which the thermocouple is subjected. Such thermocouples are very sensitive. However, the thermocouple structures are very delicate. When a thermocouple is subjected to an oxidizing atmosphere at very high temperatures, it burns out very quickly. Also, if the gas in which it is immersed carries dust or fine particles of soot, a deposit soon forms on the thermocouple which adversely affects its characteristics. The thermocouple must therefore be protected from the gas in which it is immersed. This may readily be accomplished by providing a protective casing around the thermocouple. However, such a casing introduces a lag between temperature changes outside the casing and temperature changes inside the casing at the thermocouple. In order to find an accurate indication of temperature, the thermocouple output must be compensated for this lag.

This problem has been found to be particularly troublesome in the measurement of the temperature on the exhaust gases of a jet engine. Such engines run at very high temperatures which are very close to the limit which the materials used will withstand. It is therefore desirable to provide some means for measuring the temperature of the gases in the engine and for reducing the supply of fuel to the engine before the temperature becomes too high, so as to maintain the temperature at a safe value. Since the temperature in the engine may fluctuate rapidly, it is necessary that the temperature measuring device be not only accurate but also immediately responsive to changes in temperature.

It is therefore an object of the present invention to provide improved temperature responsive means for measuring accurately temperatures which change rapidly.

A further object is to provide, for use in connection with a thermocouple, improved temperature indicating or control means responsive to both the thermocouple temperature and the rate of change of that temperature.

Another object is to provide, in connection with an electrical temperature measuring device which is used in a protective casing, means for compensating the output of the electrical temperature measuring device for the lag behind the temperature being measured due to the protective casing around the device.

Another object is to provide an improved electrical system which responds both to the magnitude and the rate of change of a voltage impressed upon it.

Other objects and advantages of the present invention will become apparent from a consideration of the appended specification, claims and drawing which illustrate, somewhat diagrammatically, a fuel supply control system for a jet engine embodying the principles of my invention.

Referring to the drawing, there is shown at 10 a portion of the tail pipe or exhaust conduit of a jet engine. Projecting through the wall of the exhaust conduit is an insulator 12 carrying a thermocouple 14. A casing 16 surrounds the thermocouple 14 to protect it from direct contact with the very hot highly oxidizing gases of the jet engine exhaust.

A pair of conductors 17 and 18 connect the thermocouple to the input terminals of a pre-amplifier 20. The output terminals of the pre-amplifier 20 are connected by conductors 150 and 156 to a series circuit consisting of a resistance 154 and a condenser 152. A contact 30 is slidably adjustable along resistance 154, and is connected by a conductor 32 to an input terminal of an amplifier 158. An extension of conductor 156 connects with the other input terminal of amplifier 158.

Conductor 150, and a conductor 160 from the output terminal of amplifier 158 are connected in one arm of a Wheatstone bridge circuit generally indicated at 36 and having a pair of input terminals 38 and 40, and a pair of output terminals 42 and 44.

A fixed resistance 46 is connected between input terminal 38 and output terminal 42. Connected between input terminal 40 and output terminal 42 is a branch consisting of conductor 150, conductor 160 from the output terminal of amplifier 158, a fixed resistance 48, and a conductor 50. Input terminal 40 is connected to output terminal 44 through a fixed resistance 52. Input terminal 38 is connected to output terminal 44 through a fixed resistance 54 and a resistance 56 which is variable by means of a slider 58 which moves along it.

The output terminals 42 and 44 are connected by means of conductors 60 and 62 to a polarized relay 64. The relay 64 includes a contact 66 movable between stationary contacts 68 and 70. The relay 64 controls a reversible motor generally indicated at 72, having an armature 74 and field windings 76 and 78.

When contact 66 engages contact 68, an energizing circuit is completed for armature 74 and field winding 78. This circuit may be traced from the upper terminal of the secondary winding 80 of a transformer 82 through a conductor 84, contacts 66 and 68, a conductor 86, field winding 78, conductors 88 and 90, and armature 74 to the lower terminal of winding 80.

When contact 66 engages contact 70, an energizing circuit for armature 74 and field winding 76 is completed, which may be traced from the upper terminal of winding 80 through conductor 84, contacts 66 and 70, conductor 92, field winding 76, conductors 94 and 90, and armature 74 to the lower terminal of winding 80.

The motor 72 drives a shaft 96, which carries an internally threaded nut 98. A threaded shaft 100 rides in the nut 98, and is suitably guided to prevent its rotation. The shaft 100 carries the slider 58. The opposite end of shaft 100 serves as a valve to control the flow of fluid from an inlet conduit 102 to a conduit 104 leading to a chamber 106. One side of chamber 106 is closed by a diaphragm 108. The chamber 106 is provided with an outlet passage 110 having a restriction 112 therein. The diaphragm 108 carries at its center a valve 114, which controls the flow of fuel from an inlet passage 116 to an outlet passage 118.

*Operation*

It is well known that the rate of flow of heat between two points at different temperatures is proportional to the difference between those temperatures. Hence the rate of flow of heat from the jet engine exhaust gases to the thermocouple 14 is proportional to the difference between the gas temperature and the thermocouple temperature. It has been found that the temperature of the gas is equal at any time to the thermocouple temperature plus a constant factor times the rate of change of the thermocouple temperature. In order to measure the gas temperature, therefore, it is necessary to add a component which varies with the thermocouple temperature to a component which varies with the rate of change of the thermocouple temperature. The sum of two such components, if they are properly selected to compensate for the lag of the thermocouple behind the changes in the gas temperature, will give a true indication of the gas temperature at any instant.

The output potential of the thermocouple 14 is a measure of the temperature at the thermocouple at any given instant. This potential is amplified by the preamplifier 20, and the amplified potential is then impressed across the resistance 154 and condenser 152 in series.

The potential drop across condenser 152 varies in accordance with the steady state value of the thermocouple output potential. Under constant temperature conditions at the thermocouple, the potential drop across resistance 154 is zero, but when the thermocouple temperature and its output potential vary, the potential drop across resistance 154 varies in accordance with the rate of change of the thermocouple output potential. As long as the output potential of the preamplifier 20 is constant, it appears entirely across the condenser 152, there being no current flow through resistance 154 and no potential drop across it. When the output potential of pre-amplifier 20 changes, a potential drop appears across resistance 154 which is a measure of the rate of change of the pre-amplified output potential. This potential drop across resistance 154 is amplified by an amplifier 158 so that the resulting entire potential drop appearing between conductors 150 and 160 is equal to the sum of the potential drop across condenser 152, plus the amplified potential drop across resistance 154. The potential drop across condenser 152 is a measure of the temperature at the thermocouple 14, while the potential drop across resistance 154 is a measure of the difference between the thermocouple temperature and the exhaust gas temperature. The potential between conductors 150 and 160 is therefore a measure of the exhaust gas temperature.

This input potential (between conductors 150 and 160) is impressed in one arm of the Wheatstone bridge circuit 36. Any unbalance of the bridge circuit causes the polarized relay 64 to operate the reversible motor 72 to drive shaft 96 in the proper direction so that slider 58 moves along resistance 56 to restore the balance of the bridge circuit. Any unbalance of the bridge circuit is caused by a change in the temperature of the exhaust gases, and since such unbalance causes a rebalancing of theh bridge circuit by a movement of slider 58, it may be stated that the position of slider 58 along resistance 56 is a measure of the temperature of the exhaust gases. It may also be stated that the lateral position of shaft 100 is a measure of the temperature of the exhaust gases. If desired, a suitable indicator 101 may be attached to the shaft 100 to indicate on a suitable scale 103 the exhaust gas temperature.

When the exhaust gas temperature exceeds a predetermined value, the right end of shaft 100 moves to the left so as to open the port leading to conduit 102, thereby permitting fluid to flow from inlet conduit 102 to conduit 104 and thence to chamber 106. Since the chamber 106 has a restricted outlet, the pressure in chamber 106 will build up as soon as the inlet valve is opened by an amount greater than the restriction 112. When that happens, the chamber 106 expands, closing the valve 114 and shutting off or reducing the supply of fuel to the engine until safe temperature conditions are again restored.

When the valve at the end of shaft 100 is closed, the fuel inlet pressure acting on the underside of diaphragm 108, forces valve 114 open, so as to permit a flow of fuel to the engine.

While I show and describe certain preferred embodiments of my invention, other modifications thereof will readily occur to those skilled in the art, and I therefore intend my invention to be limited only by the appended claims.

I claim as my invention:

1. Apparatus for measuring the temperature of heated gases, comprising a casing having its outer surface exposed to said gases, a single thermocouple mounted in said casing and protected thereby from said gases, means, comprising a single electric circuit, for impressing an electrical potential which varies with the output potential of said thermocouple across an electrical resistance element and an electrical capacitance element connected in series, so that the potential drop across said capacitance element varies with the temperature at said thermocouple and the potential drop across said resistance element varies with the rate of change of said temperature; means for amplifying only the potential drop across a selected portion of said resistance element so chosen as to compensate the output of said amplifying means for the lag of said thermocouple output potential due to said casing, whereby the resulting amplified potential is a true measure of the temperature of said gases at any instant of time, even when said gas temperature varies; and temperature indicating means connected to said amplifying means and responsive to said potential drops, as modified by said amplifying means.

2. Apparatus for measuring the temperature of heated gases, comprising a heat resistant casing having its outer surface exposed to said gases, a single thermocouple mounted in said casing and thereby protected from said gases; a single electric circuit means connected to said thermocouple and having means for amplifying the electrical output potential of said thermocouple; means for dividing said amplified potential into two components, one of which varies proportionally with the temperature of said thermocouple and the other of which varies proportionally with the rate of change of said temperature; adjustable means for selectively compensating said amplified potential for the time lag in the change of temperature of said thermocouple behind a change in temperature of said gases, due to said casing; means for further amplifying only the component of said amplified potential which varies proportionally with the rate of change of the temperature of said thermocouple; whereby said resulting compensated and amplified potential is a true measure of the temperature of said gases at any instant of time, even when said gas temperature varies; and means, responsive to said compensated and amplified potential, for indicating the temperature of said gases.

3. Apparatus according to claim 2, wherein said adjustable means comprises manual means for adjusting only the component of said amplified potential which varies proportionally with the rate of change in temperature of said thermocouple, so as to compensate for said time lag.

4. Apparatus for measuring the temperature of a space, comprising a device in said space having an electrical characteristic variable in accordance with temperature but lagging behind changes in temperature by an amount dependent upon the rate of change of temperature; means for producing a first electrical potential varying with said characteristic; means for obtaining from said potential two component potentials, one of which measures the steady temperature at said device and the other measures the rate of change of said temperature; means for adjusting only said other component potential so as to compensate said first potential for the lag of said device; and temperature indicating means responsive to the output of said device.

5. In a control apparatus for an engine of the jet propulsion type, comprising means for controlling the flow of fuel to said engine; a temperature responsive electrical device heated by the exhaust gases from said engine through the medium of an interposed thermal circuit and having an electrical characteristic varying in accordance with temperature but lagging behind temperature changes by reason of the effect of said thermal circuit; means for producing a first electrical potential varying with said characteristic; means for obtaining from said potential two component potentials, one varying with the temperature at said device and the other varying with the rate of change of said temperature; means for amplifying only said other component potential, so as to adjust said first potential for the lag produced by said thermal circuit, whereby said resulting adjusted first potential accurately measures the exhaust gas temperature; said fuel flow controlling means being responsive to said resulting potential and effective when said temperature exceeds a predetermined value to reduce the flow of fuel to said engine.

6. In a control apparatus for an engine of the jet propulsion type, comprising means for controlling the flow of fuel to said engine; a temperature responsive electrical device heated by the exhaust gases from said engine through the medium of an interposed thermal circuit and having an electrical characteristic varying in accordance with temperature but lagging behind temperature changes by reason of the effect of said thermal circuit; means for producing an electrical potential varying with said characteristic; an electrical resistance element, an electrical reactance element, means for impressing said potential across said elements in series so that the potential drop across one of said elements varies with the temperature at said device and the potential drop across the other of said elements varies with the rate of change of said temperature; means for adjusting only the potential drop across said other element, so as to compensate for the lag produced by said thermal circuit; whereby said resulting means accurately measures the exhaust gas temperature; said fuel flow controlling means being responsive to said sum and effective when said temperature exceeds a predetermined value to reduce the flow of fuel to said engine.

7. Apparatus for measuring the temperature of heated gases, comprising a casing having its outer surface exposed to said gases, a single thermocouple mounted in said casing and protected thereby from said gases; means, comprising a single electric circuit, for obtaining from an electrical potential which varies with the output of said thermocouple two component electrical potential drops, of which the first varies with and is a measure of the temperature at said thermocouple, and the second varies with and is a measure of the rate of change of said temperature; means for amplifying only said second potential drop, so that the resulting entire potential drop is equal to the sum of said first potential drop, plus said amplified second potential drop; whereby said resulting entire potential drop is a measure of the temperature of said heated gases at any instant of time, even when said temperature is varying.

8. Apparatus according to claim 7, wherein said means for obtaining said first potential drop is electrically connected with said means for amplifying said second potential drop, so that the output potential of the former means is in series with the output of said latter means.

9. Apparatus for measuring the temperature of heated gases, comprising a casing having its outer surface exposed to said gases, a single thermocouple mounted in said casing and protected thereby from said gases; means, comprising a single electric circuit, for dividing the output electrical potential of said thermocouple into two component electrical potential drops; first means for varying one of said drops with the temperature of said thermocouple, second means for varying said other drop with the rate of change of said temperature, third means for amplifying said other drop; and means for electrically connecting said first, second and third means, so that as long as said thermocouple output potential is constant, it appears entirely across said first means, there being no potential drop across said second means and no current flow therethrough.

References Cited in the file of this patent

UNITED STATES PATENTS

| | | |
|---|---|---|
| 2,054,120 | De Florez | Sept. 15, 1936 |
| 2,282,726 | Jones | May 12, 1942 |
| 2,413,128 | Wills | Dec. 24, 1946 |
| 2,573,596 | Offner | Oct. 30, 1951 |
| 2,629,984 | Jamison et al. | Mar. 3, 1953 |
| 2,632,996 | Rood | Mar. 31, 1953 |
| 2,634,579 | Reynolds et al. | Apr. 14, 1953 |